United States Patent [19]

Oki et al.

[11] Patent Number: 5,558,420
[45] Date of Patent: Sep. 24, 1996

[54] FLAT LIGHTING DEVICE

[75] Inventors: Yoji Oki; Koichi Hanaski, both of Yokohama; Shigeo Fujisawa, Tokyo, all of Japan

[73] Assignee: Stanley Electric Co., Ltd., Tokyo, Japan

[21] Appl. No.: 337,152

[22] Filed: Nov. 9, 1994

[30] Foreign Application Priority Data

Nov. 12, 1993 [JP] Japan .................................. 5-306022

[51] Int. Cl.[6] ...................................................... F21V 5/00
[52] U.S. Cl. ............................. 362/31; 362/222; 362/311
[58] Field of Search ............................. 439/95, 108, 226, 439/228, 235, 239; 362/26, 27, 31, 221, 376, 377, 378, 222, 311, 326

[56] References Cited

U.S. PATENT DOCUMENTS

| 2,609,436 | 9/1952 | Sermeus | 362/31 |
| 2,948,580 | 8/1960 | Eisenstark | 362/26 |
| 4,075,467 | 2/1978 | Peterson | 362/31 |
| 5,142,453 | 8/1992 | Ohta et al. | 362/31 |
| 5,253,089 | 10/1993 | Imai | 359/49 |

FOREIGN PATENT DOCUMENTS

| 0454435 | 10/1991 | European Pat. Off. . |
| 1241702 | 12/1989 | Japan . |

*Primary Examiner*—Denise L. Gromada
*Assistant Examiner*—Alan B. Cariaso
*Attorney, Agent, or Firm*—Weingarten, Schurgin, Gagnebin & Hayes

[57] ABSTRACT

A flat lighting device designed to be free from accidental breakage of the leading-in wires for the luminous body comprised therein if they are subjected to vibration in use to consequently enhance the overall reliability of the flat lighting device. Such a flat lighting device comprises a panel-shaped transparent substrate, a light source holding unit fitted to an end face of the substrate and a tubular luminous body fitted to said light source holding unit and is characterized in that said light source holding unit is made of a conductive material and has a substantially U-shaped cross section such that it engages said end face at the open side thereof and that one of the leading-in wires of said luminous body is connected to said light source holding unit to form thereon a power feed section for the luminous body.

2 Claims, 2 Drawing Sheets

FLAT LIGHTING DEVICE

BACKGROUND OF THE INVENTION

1. Field of the Invention

This invention relates to an improvement made to a flat lighting device to be used as a back light of a dot-matrix type liquid crystal display panel to be suitably used for an apparatus for office automation (so-called an OA apparatus) or a television receiving set.

2. Background Art

FIG. 4 of the accompanying drawings schematically illustrates a conventional flat lighting device 90 of the type under consideration comprising a panel-shaped transparent substrate 91 typically made of synthetic resin, a light source holding section 92 formed of a silicon rubber or the like, said lighting source holding section 92 being provided with a light source securing hole 92a and having a substantially U-shaped cross section, and a reflective member 93 made of brass being coated with aluminum by vacuum deposition.

A reflector panel 94 and a diffuser panel 95 are then fitted to the rear side and the front side of the flat lighting device 90 having a configuration as described above and a tubular luminous body 96 such as a cold-cathode fluorescent lamp is put into said light source securing hole 92a so that the flat lighting device 90 can illuminate the entire area of the rear side of a liquid crystal display panel 80 arranged in front of the flat lighting device 90 with a uniform distribution of brightness.

In a conventional flat lighting device 90 as described above, the leading-in wires 96a, 96a of the luminous body 96 are normally arranged at the respective opposite ends of the light source holding section 92 and, therefore, a very long feed wire 98 is required to connect one of the leading-in wires and a power supply unit 97 of the flat lighting device 90 if the latter is arranged at a lateral side of the flat lighting device 90 that is remote from the leading-in wire 96a. If the flat lighting device 90 is housed in a piece of portable equipment which is moved frequently, then the leading-in wire 96a that is vulnerable to vibration and connected to a long feed wire 98 can be easily damaged to force the equipment out of functioning.

Therefore, it is the object of the present invention to provide a flat lighting device that is free from the above identified problem.

SUMMARY OF THE INVENTION

According to the present invention, the above object is achieved by providing a flat lighting device comprising a panel-shaped transparent substrate, a light source holding unit fitted to an end face of the substrate and a tubular luminous body fitted to said light source holding unit characterized in that said light source holding unit is made of a conductive material and has a substantially U-shaped cross section such that it engages said end face at the open side thereof and that one of the leading-in wires of said luminous body is connected to said light source holding unit to form thereon a power feed section for the luminous body.

Now, the present invention will be described by referring to FIGS. 1 and 2 of the accompanying drawings that illustrate a preferred embodiment of the invention.

DETAILED DESCRIPTION OF THE PREFERRED EMBODIMENTS

Figure 1:
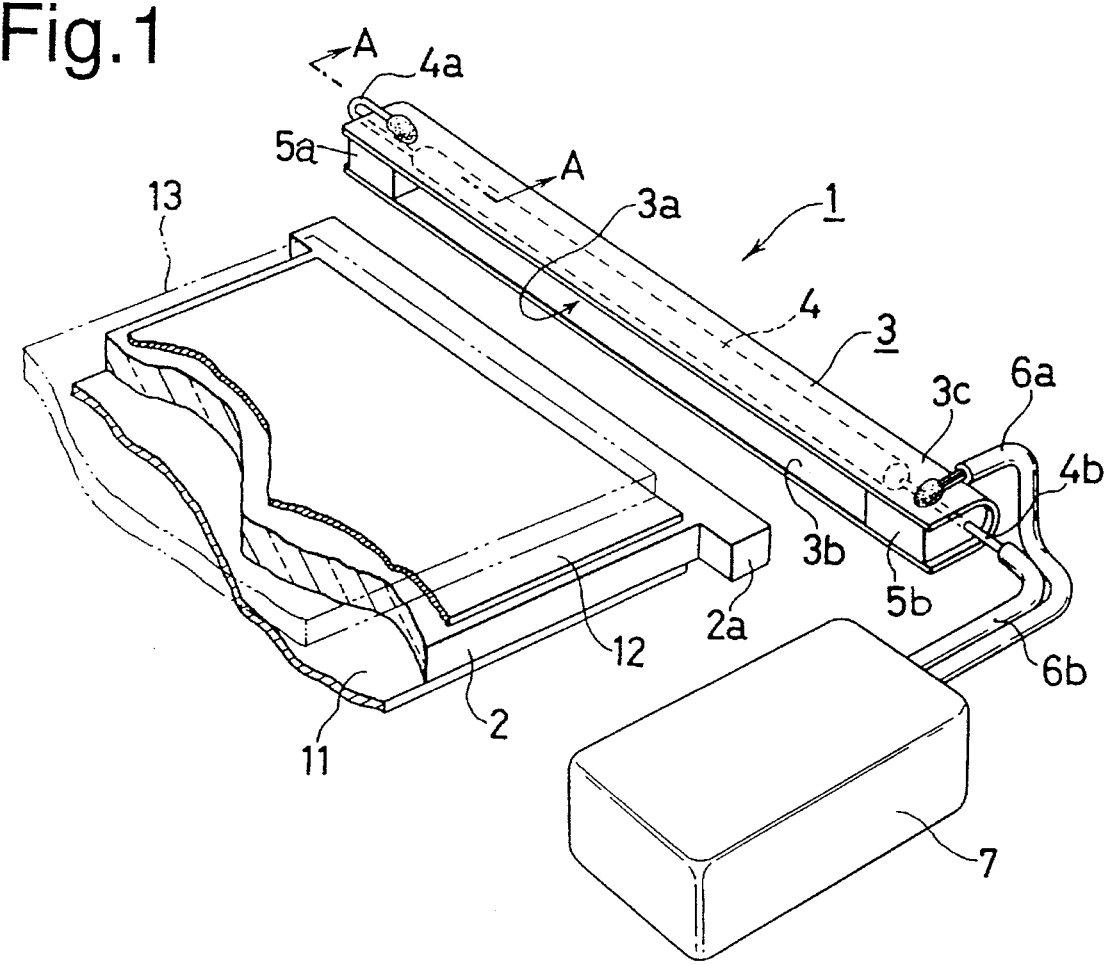
FIG. 1 is an exploded schematic partial perspective view of a preferred embodiment of the flat lighting device according to the present invention.
Figure 2:
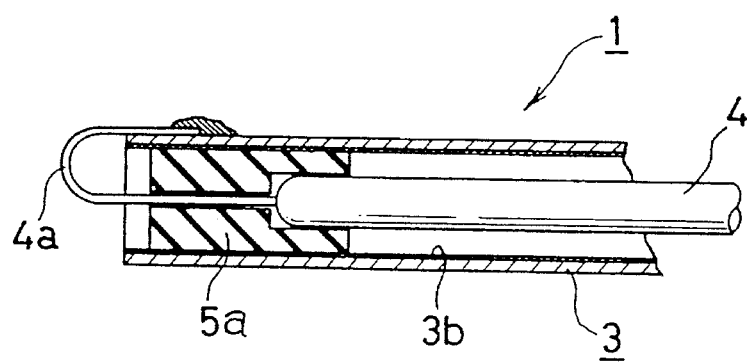
FIG. 2 is a schematic partial sectional view of the embodiment of FIG. 1 taken along line A—A.

Referring to FIGS. 1 and 2, the embodiment of flat lighting device is generally denoted by reference numeral 1 and comprises a panel-shaped transparent substrate 2 typically made of a transparent resin material, a light source holding unit 3 fitted to an end face 2a of the transparent substrate 2 and a tubular luminous body 4 arranged in the light source holding unit 3 for the purpose of lighting. The arrangement of the flat lighting device is not particularly different from that of any conventional flat lighting device of the type under consideration.

In a flat lighting device 1 according to the invention, the light source holding unit 3 is formed by bending a plate of a conductive material such as brass to show a U-shaped cross section such that it is resiliently engaged with the end face 2a of the transparent substrate 2 at the open side 3a thereof.

The inner surface of the hollow light source holding unit having a U-shaped cross section is plated with chromium or coated with silver or aluminum to produce a reflective film 3b there so that rays of light coming from the luminous body 4 may be effectively and efficiently led into the transparent substrate 2 through the end face 2a.

On the other hand, the luminous body 4 held in position in said light source holding unit 3 by means of a pair of holder members 5a, 5b which are prepared from a resilient insulating material such as silicon rubber to show an appropriate profile in view of the fact that the light source holding unit 3 is made of a conductive material.

Figure 3:
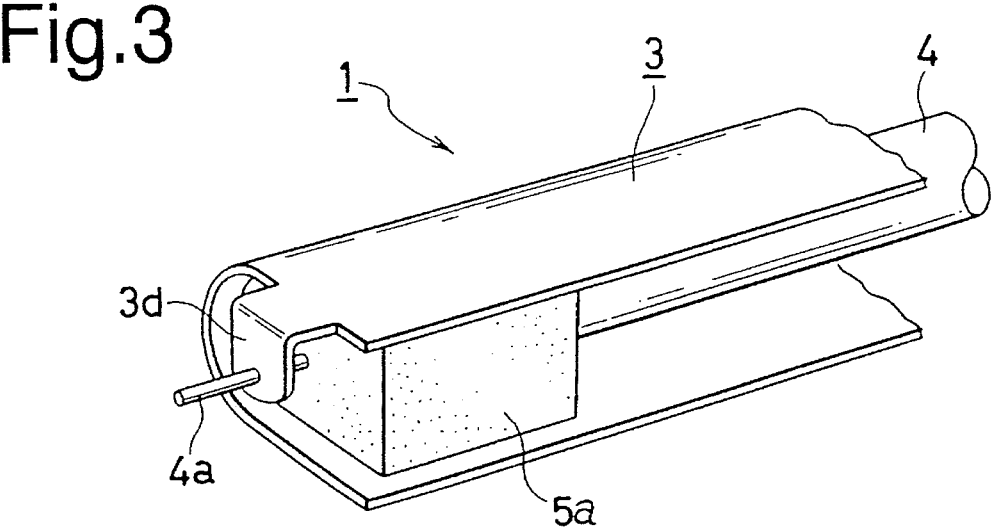
FIG. 3 is an exploded schematic partial perspective view of another preferred embodiment of the flat lighting device according to the present invention.
Figure 4:
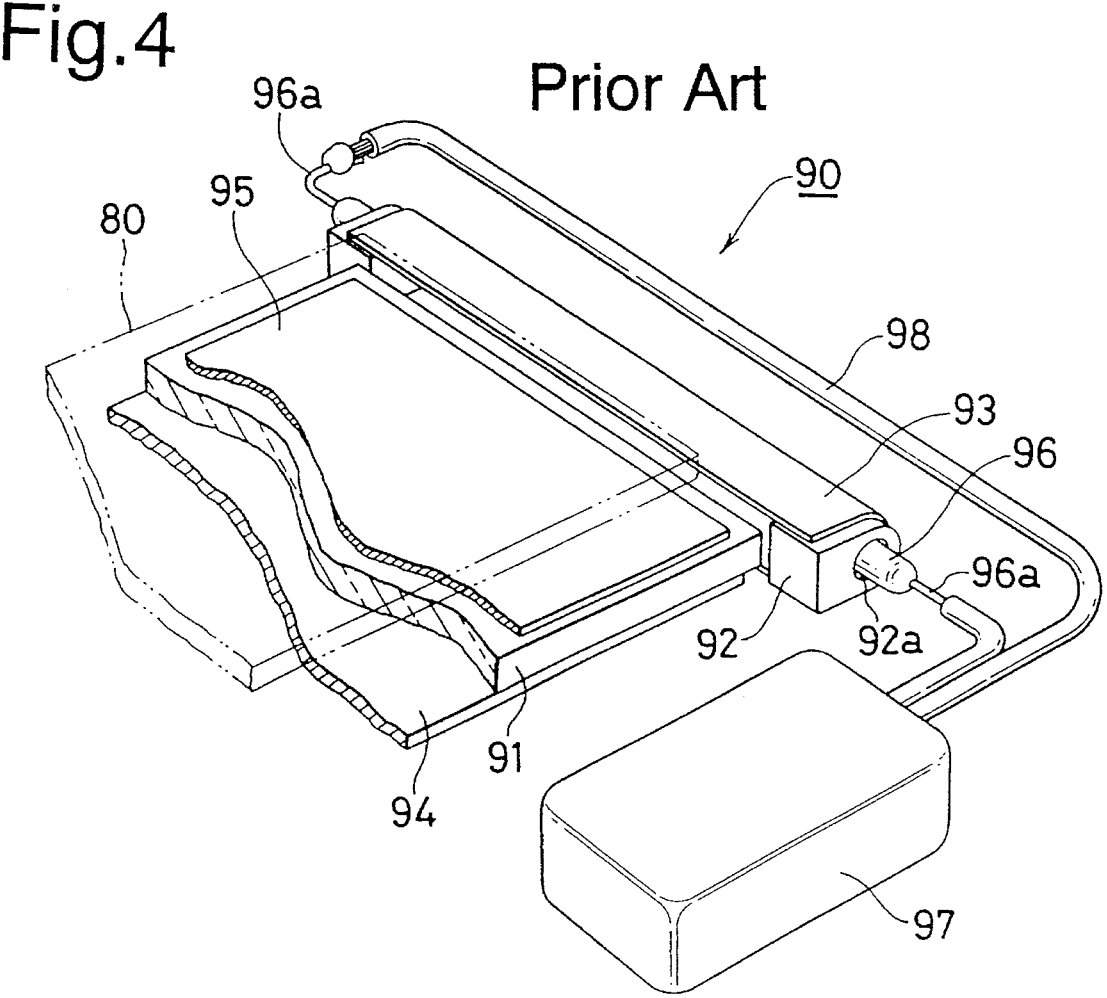
FIG. 4 is an exploded schematic partial perspective view of a conventional flat lighting device.

Additionally, one of the leading-in wires, or wire 4a, of the luminous body 4 is directly secured to the light source holding unit 3 by soldering or spot welding to form a power feed section 3c for the luminous body extending on the entire outer surface of the light source holding unit 3, while the other leading-in wire 4b is connected to a feed wire 6b, which is by turn connected to a power supply unit 7 as in the case of conventional flat lighting devices. In addition, as shown in FIG. 3, it is possible to provide a power feed section extension 3d for the luminous body wherein said power feed section extension 3d is formed like a tongue shape and has a hole through which the leading-in wire 4a can be connected by bending the power feed section extension 3d without bending the leading-in wire 4a.

In order for the flat lighting device to withstand vibration it may be subjected to while it is being moved for a prolonged period of time, the feed wire 6b connected to the leading-in wire 4b should be made as short as possible. In other words, the power supply unit 7 should be placed close to the leading-in wire 4b to which the feed wire 6b is connected. Since the entire outer surface of the light source holding unit 3 constitutes the power feed section 3c for the luminous body as described above, the feed wire 6a for connecting the leading-in wire 4a and the power supply unit 7 can be terminated at a spot close to the leading-in wire 4b on the outer surface of the light source holding unit 3 to make the feed wire 6a as short as the feed wire 6b.

Finally, as the power supply unit 7 is grounded by way of the feed wire 6a which is electrically connected to the light source holding unit 3, the luminous body 4 where the phenomenon of electric discharge takes place once it is energized is almost totally covered by the grounded light source holding unit 3 that effectively blocks any electromagnetic noise that may be generated in the luminous body 4 by electric discharge from going out.

As in any conventional flat lighting devices, a reflector panel 11 and a diffuser panel 12 are respectively bonded to the rear side and the front side of the transparent substrate 2 by appropriate means and a dot-matrix type liquid crystal display panel 13 is arranged in front of the diffuser panel 12 so that the liquid crystal display panel 13 can be illuminated from the rear side by the flat lighting device 1.

ADVANTAGES OF THE INVENTION

In a flat lighting device according to the invention, as described above in detail, since the light source holding unit is made of a conductive material and has a substantially U-shaped cross section such that it engages the corresponding end face of the transparent substrate at the open side thereof and one of the leading-in wires of the luminous body is connected to the light source holding unit to form thereon a power feed section for the luminous body, the leading-in wire located remote from the power supply unit can be fitted directly to the light source holding unit to form thereon a power feed section for the luminous body while the other leading-in wire is not directly connected to a feed wire to allow the leading-in wires to be made very short and free from accidental breakage if they are subjected to vibration in use to consequently enhance the overall reliability of the flat lighting device.

Additionally, since the light source holding unit is grounded, the luminous body that can generate electric discharge and consequent induction noise in it once it is energized is almost entirely covered by the light source holding unit to block any noise from going out and protect the OA apparatus or the television set incorporating the flat lighting device against malfunctioning due to such noise.

What is claimed is:

1. A flat lighting device comprising a panel-shaped transparent substrate, a light source holding unit fitted to an end face of said substrate and a tubular luminous body fitted to said light source holding unit, wherein said light source holding unit is made of a conductive material and has a substantially U-shaped cross section with an open side such that said light source holding unit engages said end face at said open side, and wherein a leading-in wire of said luminous body is connected to said light source holding unit to form thereon a power feed section for said luminous body.

2. A flat lighting device according to claim 1, wherein said power feed section for said luminous body is grounded.

* * * * *